United States Patent [19]
Brock et al.

[11] 3,869,110
[45] Mar. 4, 1975

[54] AGGREGATE ANALYSIS AND DELIVERY SYSTEM

[75] Inventors: James Donald Brock; Erbie G. Mize; Henry G. Rylander, all of Chattanooga, Ga.

[73] Assignee: CMI Corporation, Oklahoma City, Okla.

[22] Filed: Nov. 24, 1972

[21] Appl. No.: 309,112

[52] U.S. Cl. ............................................. 259/149
[51] Int. Cl. ............................................. B28c 7/04
[58] Field of Search ........... 259/148, 149, 154, 153; 73/61.4, 432 PS

[56] References Cited
UNITED STATES PATENTS

| | | | |
|---|---|---|---|
| 2,379,158 | 6/1945 | Kalischer | 73/61.4 |
| 2,597,899 | 5/1952 | Payne | 73/61.4 |
| 2,727,733 | 12/1955 | Carswell | 259/154 |
| 2,877,524 | 3/1959 | Bishop | 259/154 |
| 3,170,677 | 2/1965 | Phister | 259/154 |

*Primary Examiner*—Robert W. Jenkins
*Attorney, Agent, or Firm*—Dunlap & Codding

[57] ABSTRACT

Aggregate in predetermined ranges of aggregate particle sizes is delivered to an aggregate dryer from separate aggregate storage bins each containing aggregate particles in a specified size range and possibly a minor percentage of the particles outside the specified size range. A sample of the aggregate is periodically taken from each aggregate bin and analyzed to determine the percentages of aggregate particles in each range of aggregate particle sizes. Aggregate is delivered from the various aggregate bins on a volume based upon the tested samples to an asphalt manufacturing plant.

2 Claims, 8 Drawing Figures

AGGREGATE ANALYSIS AND DELIVERY SYSTEM

BACKGROUND OF THE INVENTION

In the manufacture of asphalt and similar materials for road beds, it is customary to mix hot bituminous liquid and a rock aggregate to form the asphalt mix. The aggregate placed in the mix usually is graded by screening, etc., to provide the particular range of aggregate particle sizes in the asphalt mix which is desirable for the various construction purposes. For instance, the formation of the lower level of a road usually is made with an asphalt mix having large aggregate particles while the upper or surface layer of such a road usually will have smaller aggregate particles. Also, a specified mixture of aggregate sizes may be utilized.

Most highway construction authorities require the aggregates mixed with the bituminous liquid to be properly sized, and to assure the proper sizing of the aggregate many construction authorities require the aggregate to be sized just prior to entering the mixing chamber as by passing the aggregate through a screen gauge. This usually requires a tall structure elevated above a passageway for trucks which carry the mix to a construction site, and the tall structure usually includes an elevating conveyor to lift the aggregate from ground level to the top of the structure, an aggregate screening section, aggregate receiving hoppers below the screening section, a pug mill below the hoppers and the framework and mechanical devices necessary to support and operate these mechanisms. This typical asphalt manufacturing structure is expensive to manufacture, difficult to assemble and disassemble, difficult to operate and maintain, and must operate on a batch basis instead of a continuous flow basis, which frequently causes the vehicles for transporting the mix to wait for a batch to be prepared.

SUMMARY OF THE INVENTION

Briefly described, the present invention comprises an aggregate delivery system which includes an aggregate particle size analysis system that enables the aggregate delivery system positioned at ground level to continuously deliver aggregate having a proper range of aggregate particle sizes directly to an aggregate dryer, etc., of an asphalt manufacturing plant. The aggregate usually is purchased in specified particle sizes so that the major portion of its particles are received within a specified range of particle sizes, and supplies of aggregates in varied specified ranges are separately maintained in a series of aggregate storage bins for delivery to the aggregate dryer by means of a common conveyor. The operator of the system causes aggregate to be fed from one or more of the several aggregate bins onto the common conveyor. In order to determine which supplies of the aggregates are to be fed to the conveyor and what ratio is desired from each bin, a sample of the aggregate is taken from each bin and the particle sizes of the samples are analyzed. The operator then adjusts the rate of delivery of aggregate from each bin to the common conveyor to provide the desired aggregate mix to pass through the aggregate dryer and ultimately onto the mixing chamber where the hot bituminous liquid is mixed with the aggregate mixture.

The analysis of the aggregate particle size is made by allowing samples of aggregate from each aggregate storage bin to freely fall through a body of liquid from a predetermined height to a weighing platform and calculating the time lapse required for the aggregate particles to accumulate on the weighing platform. Since a larger aggregate particle moves more rapidly than a smaller aggregate particle under the influence of gravity through liquid, the time lapse for the vertical travel of an aggregate particle through liquid provides a reliable indication of the aggregate particle size. When a sample batch of aggregate particles from a single aggregate storage bin is released in a body of liquid, the larger particles will reach the weighing platform before the smaller particles, and by calculating the time lapse between release and during accumulation, a reliable indication of the range of aggregate particle sizes in the batch is obtained. This information from each aggregate bin is continually fed to a computer which selects the proper mixture of aggregate to be delivered from the bin to the common conveyor to obtain the desired mixture of aggregate particle sizes.

Thus, it is an object of this invention to provide an aggregate delivery system for an asphalt plant or the like which functions to deliver aggregate particles in the proper range of particle sizes directly from a storage area to a delivery point without requiring screening or other sizing of the aggregate.

Another object of this invention is to provide apparatus for mixing together and delivering aggregate or the like from different sources in selected ranges or mixtures of particle sizes.

Another object of this invention is to provide an aggregate analysis system and a system of delivering aggregate which is inexpensive to construct and maintain, which functions reliably and expediently and which does not require the screening or sizing of aggregate prior to delivering the aggregate to a mixing chamber where the aggregate is mixed with a hot bituminous liquid.

Other objects, features and advantages of the present invention will become apparent when reading the following specification, when taken into conjunction with the accompanying drawing.

DESCRIPTION OF THE PREFERRED EMBODIMENTS

Figure 1:
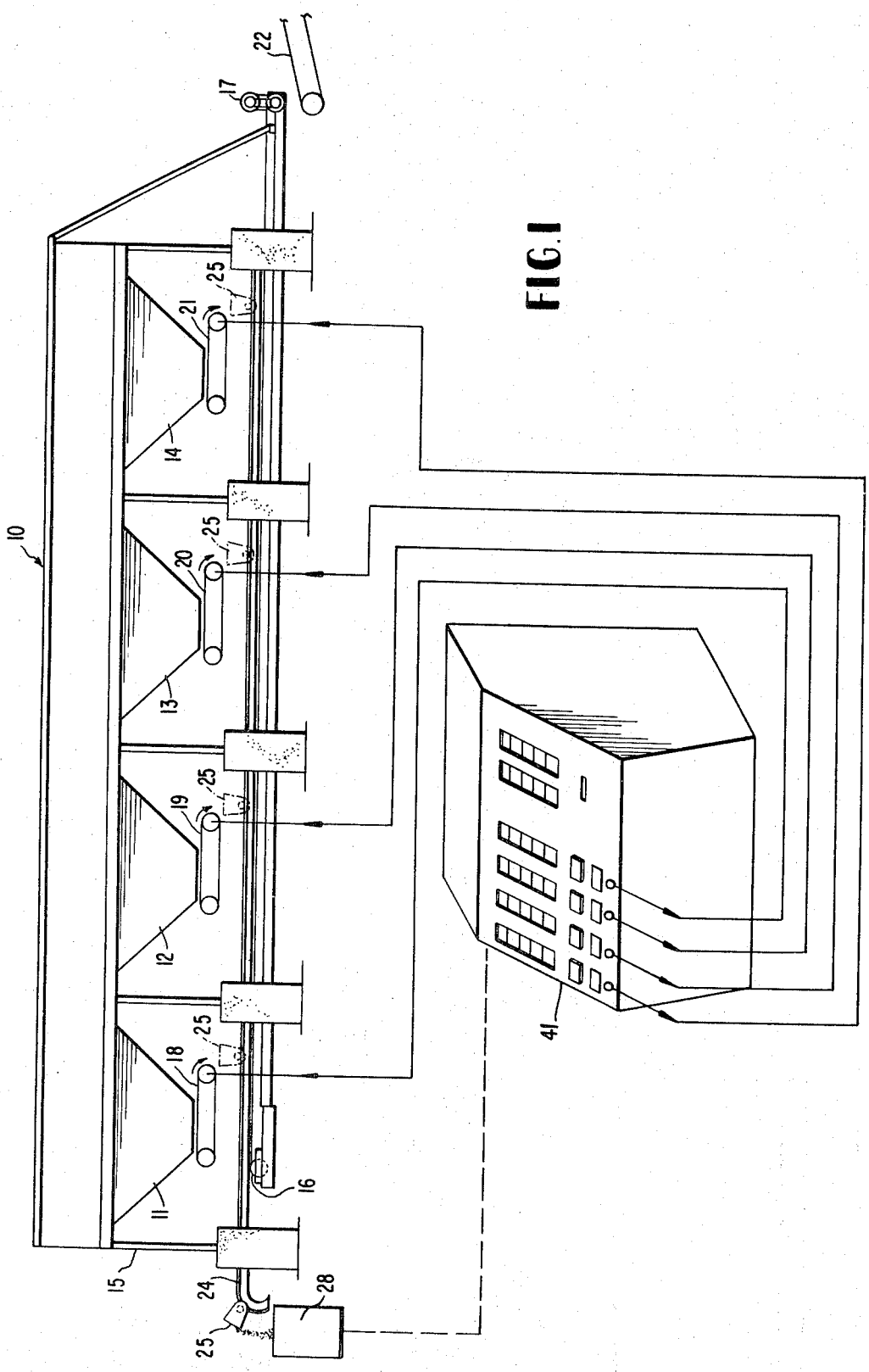
FIG. 1 is a schematic illustration of the aggregate delivery system.

Referring now in more detail to the drawing, in which like numerals indicate like parts throughout the several views, FIG. 1 shows aggregate storage area 10 which includes a plurality of aggregate storage bins 11, 12, 13 and 14 which are supported in a common framework 15 above a common delivery conveyor 16. Individual belt feeders 18, 19, 20, 21 are positioned below the outlets of storage bins 11–14 respectively, and when the belt feeders are in operation, aggregate will be delivered from the storage bins onto the surfaces of the belt feeders and then onto the upper flight of delivery conveyor 16. Delivery conveyor 16 is driven by motor 17 and delivers the aggregate to dryer conveyor 22 which takes the aggregate to an aggregate dryer in the asphalt plant (not shown).

A monorail or a pair of spaced apart rails 24 extend along framework 15 at a level approximately between the belt feeders 18–21 and delivery conveyor 16. A sample bucket 25 is mounted on rails 24 and arranged to move along the framework beneath the belt feeders 18–21. As is illustrated in dashed lines, bucket 25 can be positioned at the delivery end of each of the belt feeders 18–21 to receive a sample batch of the aggregate delivered from a storage bin 11–14 and then transported to the rear of framework 15 and tilted to dump its sample.

Figure 2:
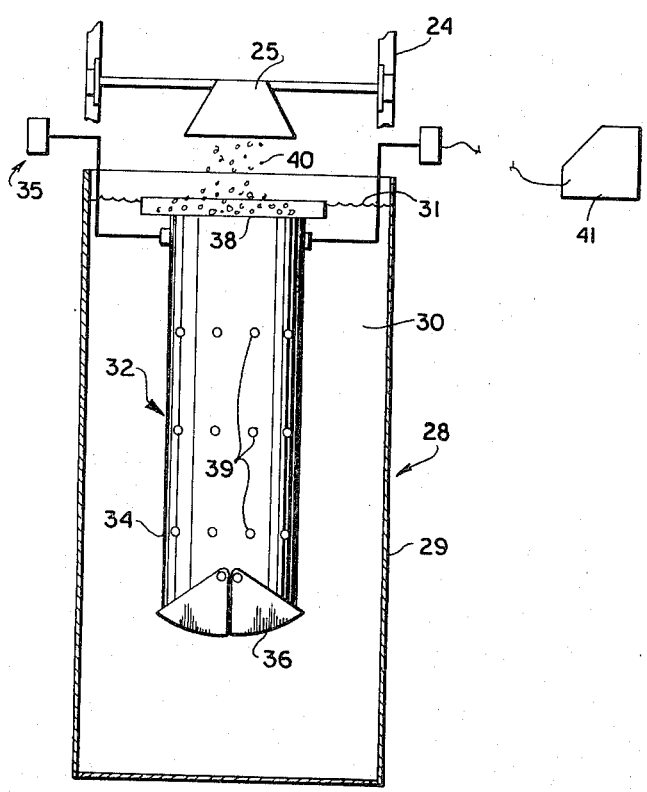
FIG. 2 is a schematic illustration of the aggregate analysis grading chamber.

Grading chamber 28 is positioned at the end of rails 24 so as to receive the sample batch of aggregate dumped from sample bucket 25. As is illustrated in FIG. 2, grading chamber 28 comprises tank 29 which is open at its upper end and arranged to contain a body of liquid 30 such as water at a known temperature and having a predetermined level 31. Aggregate weigher 32 comprises inner housing 34 suspended within tank 29 and supported at its upper end by scale means 35. The bottom end of inner housing 34 is normally closed by clam gates 36 which function as a weighing platform and an aggregate outlet gate. The upper end of inner housing 34 is normally closed by gates 38 which function as aggregate release means. Gates 38 are positioned immediately above the level 31 of the body of water 30. Inner housing 34 defines a plurality of small openings 39 at spaced intervals along its height.

Figure 3A:
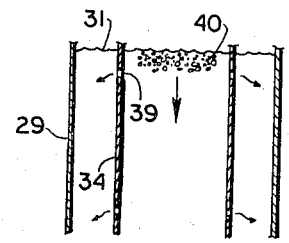
FIGS. 3a, 3b, 3c and 3e are progressive schematic illustrations of an aggregate batch in the aggregate grading chamber.

Sample bucket 25 is arranged to tilt and deposit its sample batch of aggregate onto gates 38. When gates 38 open, the batch 40 of aggregate is deposited in the body of water 30 and moves under the influence of gravity through the body of water through inner housing 34 toward closed clam gates 36. As is illustrated in FIG. 3a, the sample batch 40 first enters the body of water as a mass and moves downwardly through the liquid medium. While the level of water initially rises within inner housing 34 because of the displacement of some of the water by the aggregate batch 40, the water level returns to a level equal with the level of the water outside inner housing 34 by the passage of a small portion of water through the openings 39 in inner housing 34.

Figure 3B:
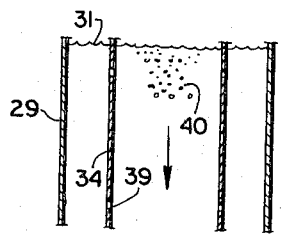
Figure 3C:
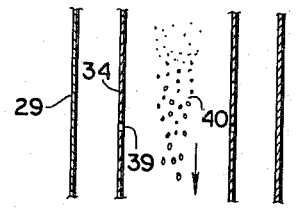
Figure 3D:
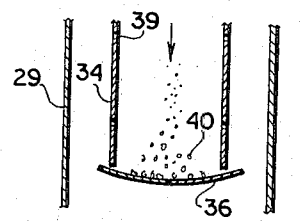
Figure 3E:
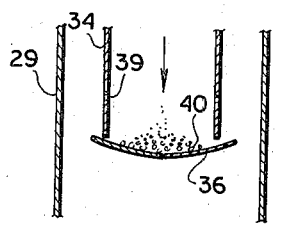

As the batch 40 moves under the influence of gravity in a downward direction through inner housing 34, the aggregate particles tend to separate as illustrated in FIGS. 3b and 3c, with the larger aggregate particles moving down through the liquid medium with greater velocity than the smaller aggregate particles, so that the batch of the particles tend to spread vertically in the body of water within inner housing 34. This is because the larger aggregate particles have a higher weight to surface area than the smaller particles and the ratio of frictional contact of the liquid medium on the surface of the particles to the weight of the particles is lower for the larger particles than it is for the smaller particles. As is illustrated in FIG. 3d, the larger particles 41 reach clam gates 36 ahead of the smaller particles, and the aggregate particles accumulate on the clam gates 36 over a time lapse until the smaller aggregate particles come to rest on the clam gates or upon the previously accumulated larger particles, as shown in FIG. 3e.

Scale means 35 (FIG. 2) detects the weight of inner housing 34, clam gates 36 and the body of water within inner housing 34. Since the level of water inside the inner housing 34 is maintained at the same level as the water outside the inner housing, the inner housing 34 and clam gates 36 are suspended in the entire body of water and the weight of the water in inner housing 34 can be ignored. When the batch of aggregate 40 is first deposited in the body of water inside inner housing 34 and the water level inside inner housing 34 rises, the added weight of the displaced water will be detected by scale means 35 but since the water levels equalize before the aggregate batch reaches the bottom of inner housing 34, this initial variance in weight of inner housing 34 is ignored.

Since the aggregate particles in the batch 40 are heavier than the water displaced from inner housing 34, the difference in the weight between the aggregate particles and the displaced water is compensated for by the movement of the aggregate particles in a downward direction through the water under the influence of gravity, and scale means 35 detects primarily only the weight of inner housing 34 and clam gates 36 as the batch 40 of aggregate moves in a downward direction through the inner housing toward the clam gates.

Figure 4:
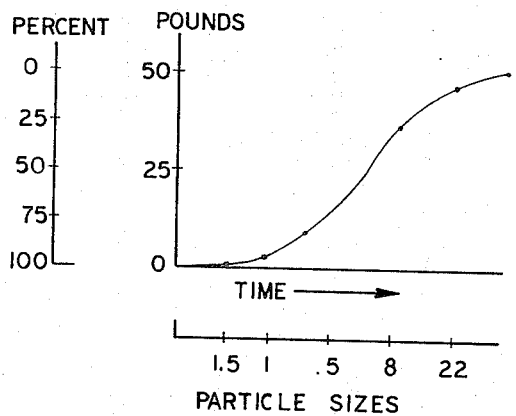
FIG. 4 is a graph comparing the time lapse and weight of the aggregate batch accumulated at the bottom of the aggregate grading chamber.

As the larger particles of the batch of aggregate come to rest on clam gates 36, scale means 35 detects an increase in the weight of inner housing 34, and as the smaller particles of the aggregate batch accumulate on the clam gates 36, scale means 35 detects an increasing weight. Scale means 35 is connected to computing means 41 which plots the change in weight of scale means 35 over a time lapse. As is illustrated in FIG. 4, the time lapse is plotted along the abscissa while the weight of the aggregate batch accumulating on clam gates 36 is plotted along the ordinate. The time lapse from the time of release of the batch 40 until the particles reach clam gates 36 will depend upon the distance between the position where the aggregate batch is released and the clam gates 36, the size of the particles in the batch of aggregate, the specific gravity of the type aggregate being analyzed, and the viscosity of the liquid medium. Of course, a more accurate measurement can be made when the distance between the aggregate release position and the clam gates is larger since a longer distance of travel of the particles would result in more particle separation, and the larger separation of the particles is more easily detected by scale means 35.

As an example, a 50 pound sample batch of aggregate is deposited by sample bucket 25 onto gates 38 of grading chamber 28. Gates 38 are opened to lower the batch 40 into the body of water, and the batch moves under the influence of gravity through the water in inner housing 34 a distance of five feet and accumulates on clam gates 36. As is illustrated in FIGS. 3a–3e, the aggregate in the batch 40 tends to spread vertically as the batch moves through the water, with the larger particle sizes moving faster than the smaller particle sizes. The particular aggregate has a specific gravity such that particles having an average diameter of one inch have a terminal velocity in water at 60° F. of approximately 3.5 inches per second, while aggregate particles having an average diameter of 1 and ½ inches have a terminal velocity of 4.6 inches per second. Thus, the larger particle sizes accumulate on clam gates 36 before the smaller particle sizes.

As is illustrated in FIG. 4, the particle sizes of one inch average diameter reach clam gates 36 after a lapse of approximately 17 seconds while the particle sizes of 1.5 inch average diameter reach clam gates 36 in approximately 13 seconds. The aggregate particles accumulate on clam gates 36 until a lapse of seconds have lapsed. The graph of FIG. 4 indicates that the batch contained an aggregate having 100 percent of its particles of an average diameter of 1.5 inch or less, 99 percent of its particles of 1 inch average diameter or less, 71 percent of its particles of ½ inch diameter or less, 31 percent of its particles having an average diameter corresponding to No. 8 aggregate or smaller, and 6 percent of its particles having an average diameter corresponding to No. 22 aggregate or smaller.

When the detection of the range of particle sizes has been calibrated, clam gates 36 are opened so that the batch is discharged to the bottom of tank 29, the clam gates are closed, and grading chamber 28 is then ready to calibrate a sample batch of aggregate from a different one of aggregate bins 11–14.

Computer 41 records the range of particle sizes from each sample batch of aggregate and regulates the feed conveyor 18–21 of each aggregate bin 11–14 so as to provide the mixture of aggregate particles required for the particular asphalt being mixed by the asphalt preparation plant. The sample batches of aggregate are collected continually and the computer 41 continually readjusts the feed conveyors in response to the sample batches of aggregate particles. Thus, the mixture of aggregate particles delivered to the asphalt preparation plant is virtually always within the range specified by the computer. The aggregate analysis system is constructed so that it grades aggregate from each aggregate storage bin during every 45 seconds. In a system utilizing four aggregate storage bins as illustrated in FIG. 1, the change in the range of aggregate particle sizes from a single storage bin would be detected within a time lapse from 0 to 3 minutes. Thus, conveyor 24 could function to deliver an improper aggregate mixture only up to a maximum of 3 minutes in an extreme situation. This latitude of adjustment of aggregate particle sizes is believed to be well within the limitations of most of the requirements issued by the state highway regulations.

The aggregate analysis system can be utilized with various different types of aggregate. Obviously, the different types of aggregate have different specific gravities and different surface characteristics so that the velocity at which the different aggregates move under the influence of gravity through the body of liquid will vary. In addition, the temperature and viscosity of the water or other liquid used in grading chamber 28 will vary which varies the velocity of the aggregate moving through the liquid. These and other variables can be compensated for during the operation of the grading chamber in order to obtain a reliable indication of the range of particles sizes in a given sample batch of aggregate.

While this invention has been described in detail with particular reference to preferred embodiments thereof, it will be understood that variations and modifications can be effected within the spirit and scope of the invention as described hereinbefore and as defined in the appended claims.

We claim:

1. A method of delivering a mixture of aggregate particles within a prescribed range of particle sizes to an asphalt preparation plant or the like, comprising:

feeding aggregate particles from a plurality of aggregate storage bins to a common conveyor means, each of said bins containing aggregate of a specified size range differing from each of the other bins;

conveying the aggregate with the conveyor means to the asphalt preparation plant;

periodically retrieving a sample batch of aggregate fed from each storage bin;

releasing each sample batch of aggregate in a liquid medium above a weighing scale;

detecting the time lapse and the accumulated weight on the weighing scale;

calculating the weight percentage of the particle sizes found in the sample batch; and regulating the quantity of aggregate particles fed from each of the aggregate storage bins in response to the weight percentage of the particle sizes found in the sample batches.

2. Apparatus for delivering a predetermined mixture of aggregate to an asphalt preparation plant or the like, comprising:

a plurality of aggregate storage bins, each of said bins containing aggregate of a specified size range differing from each of the other bins;

aggregate feeding means for feeding aggregate from each of said aggregate storage bins;

conveyor means for delivering aggregate from each of said aggregate feeding means to the asphalt preparation plant; and an aggregate analysis system for determining the range of aggregate particle sizes in the aggregate delivered from each storage bin to the conveyor means, comprising:

means for periodically collecting a sample batch of aggregate from each aggregate storage bin;

sampling means gravity flowing the sample batch through a liquid medium through a predetermined distance onto a weighing scale for determining the lapse of time and the weight per cent for each size of aggregate particle contained in the sample batch; and means for regulating each of the aggregate feeding means in response to the weight percentage determination of the sampling means.

* * * * *